(12) United States Patent
Osa Labrador et al.

(10) Patent No.: US 10,262,487 B2
(45) Date of Patent: Apr. 16, 2019

(54) COIN SENSOR

(71) Applicant: AZKOYEN, S.A., Peralta Navarra (ES)

(72) Inventors: Juan Ignacio Osa Labrador, Peralta Navarra (ES); Cristian Ordoyo Casado, Peralta Navarra (ES); Lorenzo Quintilla Quintilla, Peralta Navarra (ES); Jose Luis Pina Insausti, Peralta Navarra (ES); Miguel Angel Calleja Lafuente, Peralta Navarra (ES); Fernando Jose Arizti Urquijo, Donostia San Sebastian (ES); Juan Francisco Sevillano Berasategui, Donostia San Sebastian (ES)

(73) Assignee: AZKOYEN, S.A., Peralta Navarra (ES)

( * ) Notice: Subject to any disclaimer, the term of this patent is extended or adjusted under 35 U.S.C. 154(b) by 0 days.

(21) Appl. No.: 16/032,462

(22) Filed: Jul. 11, 2018

(65) Prior Publication Data
US 2019/0019368 A1    Jan. 17, 2019

(30) Foreign Application Priority Data
Jul. 11, 2017    (EP) .................................... 17382452

(51) Int. Cl.
*G01N 27/72*    (2006.01)
*G07D 5/08*    (2006.01)
(Continued)

(52) U.S. Cl.
CPC ................. *G07D 5/08* (2013.01); *G07D 5/02* (2013.01); *G01B 7/08* (2013.01); *G01B 7/10* (2013.01)

(58) Field of Classification Search
CPC ............ G07D 5/02; G07D 5/08; G07D 3/123; G07D 3/14; G07D 3/16; G07D 9/008;
(Continued)

(56) References Cited

U.S. PATENT DOCUMENTS 4,574,935 A * 3/1986 Partridge ................. G07D 5/08
194/319
5,293,979 A * 3/1994 Levasseur ................ G07D 5/08
194/317
(Continued)

FOREIGN PATENT DOCUMENTS

EP    0336018 B1    5/1998
EP    1172772 A2    1/2002
(Continued)

OTHER PUBLICATIONS

Extended European Search Report dated Dec. 21, 2017 for 17382452.5.

*Primary Examiner* — Thang X Le
(74) *Attorney, Agent, or Firm* — Lucas & Mercanti, LLP

(57) ABSTRACT

A coin sensor comprising a first inductive branch with a first inductor in series with a first resistor; a second inductive branch with a second inductor in series with a second resistor, wherein the first and second inductors are arranged facing each other on both sides of a passage channel of coins to be discriminated; at least one capacitive branch with a condenser and a resistor in series; an excitation circuit with a generator and at least one pair of switches, configured to alternately feed the first inductive branch and the second inductive branch with a pattern signal with spectral energy in two or more frequencies, such that the branch of the inductor excited at any given time is arranged in a bridge configuration with at least one capacitive branch; at least one differential amplifier configured to alternately measure the voltage between the exit nodes of the excited bridge.

14 Claims, 9 Drawing Sheets

(51) Int. Cl.
*G07D 5/02* (2006.01)
*G01B 7/06* (2006.01)

(58) Field of Classification Search
CPC ........... G07D 11/0018; G07D 11/0036; G07D 19/20; G07D 19/207
See application file for complete search history.

(56) References Cited

U.S. PATENT DOCUMENTS

| | | | |
|---|---|---|---|
| 5,353,905 A | 10/1994 | Yokomori | |
| 5,485,908 A * | 1/1996 | Wang | G07D 5/00 |
| | | | 194/317 |
| 5,823,315 A * | 10/1998 | Hoffman | G07D 5/08 |
| | | | 194/203 |
| 6,536,578 B1 * | 3/2003 | Ashley | G07D 5/08 |
| | | | 194/318 |
| 2005/0051409 A1 * | 3/2005 | Howells | G07D 5/08 |
| | | | 194/317 |
| 2012/0074959 A1 * | 3/2012 | Lee | G07D 5/08 |
| | | | 324/655 |

FOREIGN PATENT DOCUMENTS

| | | | |
|---|---|---|---|
| EP | 0886247 B1 | 5/2003 | |
| EP | 2203902 B1 | 11/2012 | |
| EP | 1445739 B1 | 7/2013 | |
| GB | 2140187 A | 11/1984 | |

\* cited by examiner

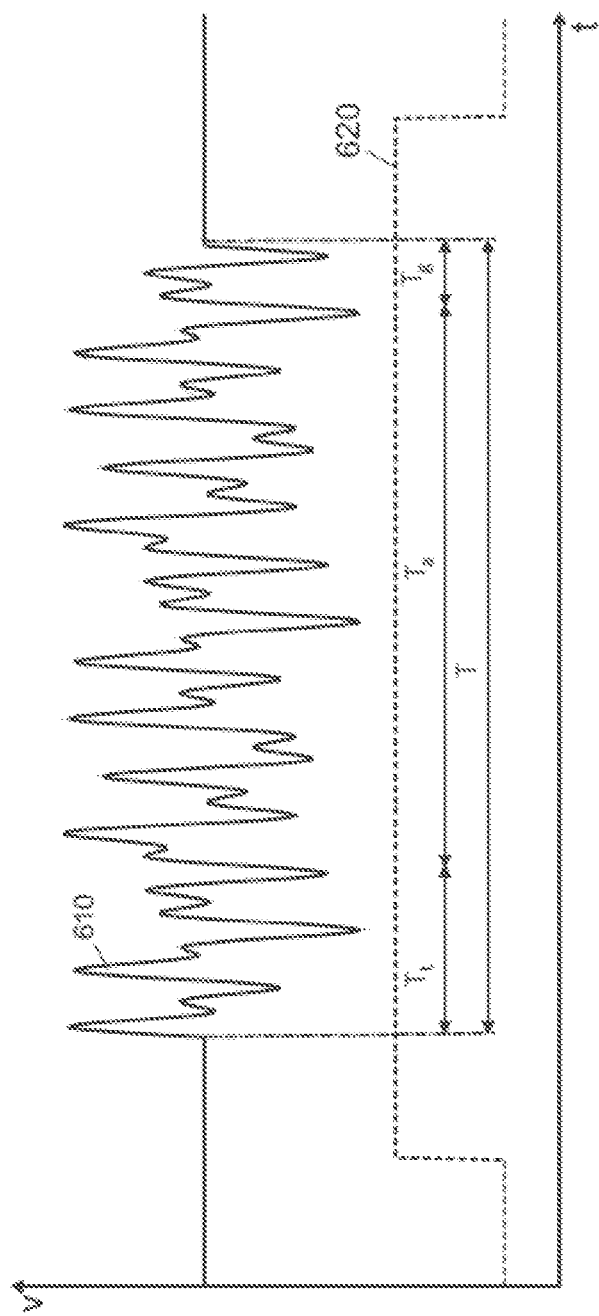

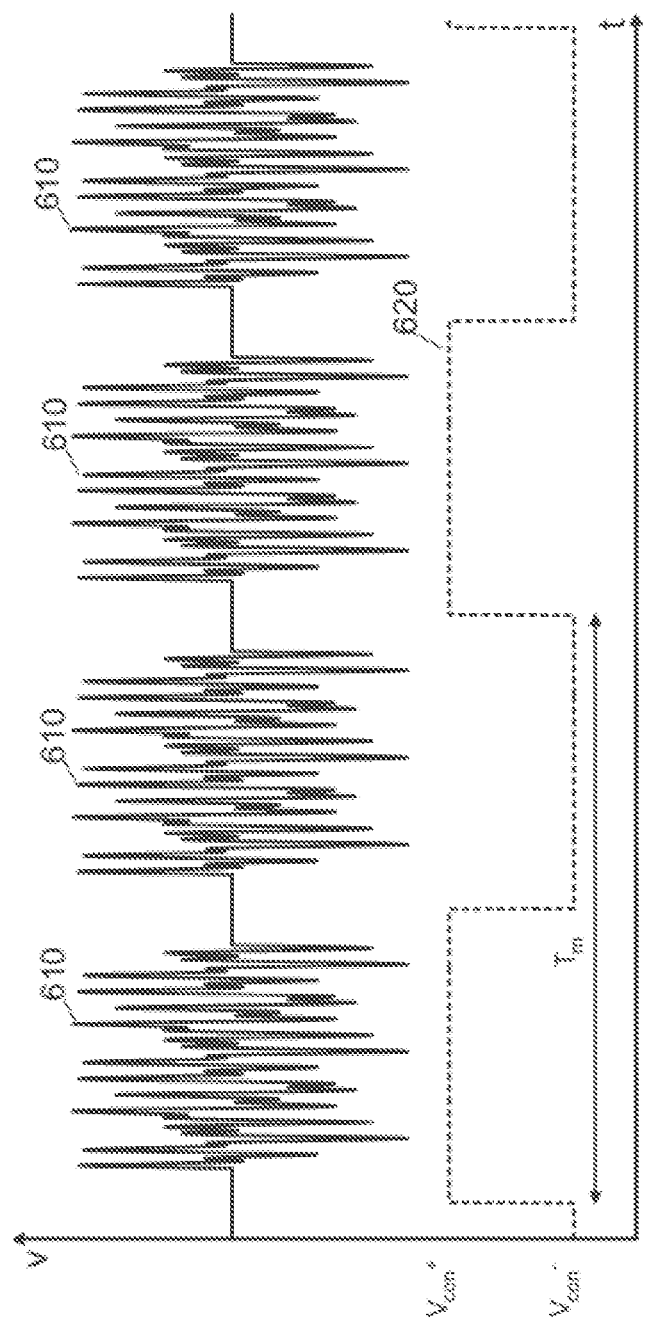

COIN SENSOR

CROSS REFERENCE TO RELATED APPLICATION

This application claims priority of European Application No. 17382452.5 filed Jul. 11, 2017, application which is incorporated herein by reference.

FIELD OF THE INVENTION

The present invention relates to a device and the corresponding method applicable to the characterisation and recognition of coins, especially of the multi-layer type, that uses one or more pairs of inductors between which the coins circulate.

BACKGROUND OF THE INVENTION

There are a multitude of devices and methods for measuring characteristics of coins and for identifying or recognising them with respect to legal tender which use inductive, capacitive, optical, electromagnetic, acoustic or piezoelectric sensors, aimed at obtaining the physical characteristics of legal tender, such as dimensional, mechanical and especially electrical and magnetic characteristics.

In the case of magnetic sensors, it is normal to use pairs of inductors arranged facing each other, between which the coins are made to pass. The inductors are formed by one or more coils that are introduced in a magnetic core to increase the intensity of the magnetic flow that reaches the coin and the opposing inductor. In order to achieve a sufficiently reliable measurement of the coins, it is normal to use more than one pair of inductors with different configurations, for example using inductors with an in-phase, out-of-phase or emitter-receiver configuration. Alternatively, the individual measurements of each of the inductors and those corresponding to the mutual configuration (emitter-receiver) can be obtained. In any of the aforementioned configurations, an important characteristic is the frequency at which the inductors work, which can vary between a few kilohertz and several megahertz, which determines different depths of penetration of the electromagnetic field in the coin. The depth of penetration of the field generated by the inductors decreases as their frequency increases and, likewise, decreases when the conductivity of the coin or its magnetic permeability increases. This characteristic is important for multi-layer coins, composed by three or more layers of different metals, a structure that represents a secure and useful characteristic for its recognition without interferences with other legal tender.

Document EP0336018B1 discloses a sensor with emitter-receiver configuration wherein an emitting inductor is used that is fed by a periodic signal with high harmonic content. Two inductors are used in the manner of a receiver, each of which is tuned to a frequency, either by means of a resonator or by means of a bandpass filter. In this manner, measurements of the attenuation of the signal emitted in two different frequencies are obtained from the passage of the coin between the emitter and the receiver. The described configuration has the drawback of using three inductors and also only operates in one mode, emitter-receiver, and is therefore not optimal, since it does not measure the impedances inherent to each of the inductors or for generating the in-phase and out-of-phase modes.

Patent EP0886247B1 proposes a sensor with two inductors arranged facing each other between which the coins are made to circulate, wherein the emitter-receiver configuration is used. The emitter uses a periodic signal with harmonic content, such as for example a square signal and the signal provided by the receiver is sampled in defined intervals that are related to the frequencies of the harmonics of the excitation signal. The analysis obtained is of the multi-frequency type by means of a single receiver and has the drawback that it only uses one operating mode and does not have individual inductor impedance measurements, which provide important information to achieve a good discrimination of genuine and counterfeit coins, either through direct information or by calculating the in-phase and out-of-phase modes.

Patent EP1172772A2 discloses a coin sensor wherein two pairs of inductors are used, one of which operates in the in-phase configuration and the other in out-of-phase configuration. Both are fed by a multi-frequency signal, in this case with the addition of three signals of different frequencies that enable analysis of the coins on the surface (high frequency), with partial penetration (intermediate frequency) and total penetration (low frequency). In this sensor, the emitter-receiver mode is not used and, furthermore, the use of two pairs of sensors makes its complexity and required space excessive.

Another example of a multi-frequency sensor can be found in publication EP2203902B1, wherein the inductor forms part of a Maxwell bridge which is fed by a pseudo-random broadband signal. In the absence of coins the bridge is sensitively balanced and, in the presence of coins, a signal appears which, once amplified, is sampled and the representative parameters of the transfer function are obtained, which will be those used to validate the coin. The proposed sensor only has one inductor, due to which it is not possible to obtain parameters related to mutual or emitter-receiver impedance.

Lastly, document EP1445739B1 discloses a method and the corresponding device wherein the coin sensor is composed of two inductors arranged facing each other between which the coin passes and the characteristics of the coin are measured, obtaining measurements of both mutual and individual impedances, which makes it possible to calculate parameters related to the three possible modes: in-phase, out-of-phase and emitter-receiver. Additionally, it has coin lift-off compensation (i.e. the change in the distance between the sensors and the coin along its travel path between the sensors, since the coin does not normally circulate to a constant position with respect thereto); however, all this is done at a single frequency, which is not ideal for a multi-layer coin sensor.

DESCRIPTION OF THE INVENTION

The object of the present invention is an electromagnetic coin sensor specially designed to measure multi-layer coins that resolves the aforementioned drawbacks. The sensor is composed of two inductors arranged facing each other between which the coin to be measured is made to pass. Each of the inductors forms part of an independent bridge (preferably a Maxwell bridge) when impedances corresponding to the sensor of the bridge being excited are measured.

The excitation of the bridge is performed by means of a pattern signal with spectral energy to the frequencies of interest. This pattern signal may be:

A multi-tone signal, with components in the specific frequencies at which we wish to obtain information on coin passage. A multi-tone signal is composed of the sum of two or more pure sinusoidal waveforms, each with its amplitude, frequency and independent phases therebetween, but constant over time. In the embodiments detailed below, the signal used is composed of three tones, but only two may be used or, on the contrary, more than three, in accordance with the information of the internal structure of the coin we wish to obtain.

A continuous spectrum signal (or broadband signal) such as, for example, white noise or pink noise, with sufficient energy at the frequencies of interest.

A variable signal over time, multiplexing different excitation signals with different spectral contents over time, such as to obtain information on the passage of the coin at different frequencies in different time windows.

Hereinafter, any of these signal types shall be referred to as "pattern signal".

The excitation of the bridge using the pattern signal is performed with the aim of obtaining parameters for validating the coin at different frequencies, measuring both the impedances inherent to each inductor and the mutual impedances therebetween (emitter-receiver), which makes it possible to calculate the response of the sensor thus built in the three possible configurations: in-phase, out-of-phase and emitter-receiver. The sensor device includes circuitry to achieve the measurements with optimum sensitivity and signal/noise ratio at the different frequencies together with the three operating modes. Likewise, the corresponding method for obtaining the aforementioned results, together with coin lift-off and inductor separation, is included.

In the discrimination of coins by means of inductive sensors, the measurements of the characteristics of the coins are obtained through Foucault currents (eddy currents) induced in the coin by the aforementioned inductors. In turn, these currents cause variations in the inductors themselves, which indirectly represent characteristics of the coin simultaneously related to its conductivity, magnetic permeability, volume, thickness, contact resistance in the case of bicolours, etc. By measuring the variations in the inducers during the passage of the coin, the characteristics that make it possible to securely identify a certain coin can be obtained. Since there is no direct correspondence between a measurement and a specific characteristic of the coin, it is convenient to obtain the maximum information from the inductors to obtain a highly reliable identification of the coins, particularly for the purpose of rejecting counterfeit coins or interferences very similar to legal tender. This is the reason why this invention includes, for each of the working frequencies, independent impedance measurements in each inductor, in addition to the characteristic of mutual impedance, which makes it possible to measure the coin in the three modes: in-phase, out-of-phase and emitter-receiver. In sensors that operate at a single frequency, the inductor is normally used associated with a condenser such that it is in resonance with the working frequency. This improves sensitivity and the signal/noise ratio and, therefore, the precision and stability of the measurements. When working with a multi-frequency signal, the previous solution is not valid and it is convenient to use a Wheatstone or Maxwell bridge-type configuration with a differential amplifier in the detection.

In the case of multi-tone or broadband signals, bridge configuration is a good option for measuring the individual components of the inductor, such as its impedance or the inductive and resistive components, but it has been verified that for measuring the mutual components between the two inductors (emitter-receiver mode), a bridge configuration with a differential amplifier has inferior characteristics to the new configuration proposed in this invention. The present invention includes a transimpedance amplifier for the R-L branch of the unexcited inductor (receiver), which has several advantages:

This topology that provides better characteristics in terms of signal/noise ratio, taking into account the low signal level to be amplified, of barely tens of microvolts.

It provides a better response in terms of frequency and a smaller phase difference. As the working frequency increases, the phase difference introduced in the amplification stage acquires greater importance in the final sensor impedance measurement obtained. The configuration with a transimpedance amplifier has a phase difference at least three times smaller with respect to the use of a differential amplifier.

Additionally, taking into account that the signal level is different when the sensor works as an emitter than when it works as a receiver, the adjustment in amplification must differ in accordance with the work mode. On using a transimpedance amplifier, the amplification of the receiver signal is independent from the amplification stage when working as en emitter, allowing an optimal adjustment of the gain for the signal level to be measured in each mode.

The coin sensor comprises an electronic circuit with a first branch that comprises a first inductor in series with a first resistor; a second branch that comprises a second inductor in series with a second resistor, wherein the first and second inductors are arranged facing each other on both sides of a passage channel of coins to be discriminated; at least one capacitive branch, wherein each capacitive branch comprises a condenser and a resistor in series; an excitation circuit comprising a generator and at least one pair of switches, wherein the excitation circuit is configured to alternately feed the first and second branch with a pattern signal with spectral energy in at least two frequencies, such that the branch of the inductor excited at any given time is disposed in a bridge configuration with at least one capacitive branch; at least one differential amplifier configured to alternately measure the voltage between the exit nodes of the excited bridge and at least a second amplifier configured to alternately measure the branch of the unexcited inductor.

The electronic circuit preferably comprises at least one transimpedance amplifier, such that the excitation circuit is configured to alternately connect the unexcited inductor to at least one transimpedance amplifier. The excitation circuit may comprise a first switch in the first branch, in series with the first inductor and the first resistor; a second switch in the second branch, in series with the second inductor and the second resistor.

In one embodiment, the electronic circuit comprises a third and a fourth branch comprising a condenser and a resistor, said branches being respectively connected to the first and second branch, alternately forming a bridge when the excitation circuit feeds the corresponding branch; wherein the at least one differential amplifier comprises a first differential amplifier connected to the intermediate nodes of the first and third branch, and a second differential amplifier connected to the intermediate nodes of the second and fourth branch; and wherein at least one transimpedance amplifier comprises a first and second transimpedance amplifier respectively connected to the first and second branch when the corresponding branch is not excited. The first switch may be configured to connect the first branch alternately to the third branch and to the first transimpedance amplifier; and wherein the second switch is configured to connect the second branch alternately to the second transimpedance amplifier and to the fourth branch.

In another embodiment, the electronic circuit comprises a common branch with a condenser and a resistor, said common branch being alternately connected to the first branch and to the second branch, alternately forming a bridge when the excitation circuit feeds the corresponding branch; wherein at least one differential amplifier comprises a common differential amplifier with a first input connected to the intermediate node of the common branch and a second input alternately connected to the intermediate node of the first branch and to the intermediate node of the second branch; and wherein the at least one transimpedance amplifier comprises a common transimpedance amplifier alternately connected to the first branch and to the second branch, when the corresponding branch is not excited. The excitation circuit may be configured to feed the common branch and alternately the first and second branch with a symmetrical power supply. The excitation circuit may comprise a third switch in the first branch that alternately connects the first inductor to the negative voltage of the symmetrical power supply and to the voltage reference; and a fourth switch in the second branch that alternately connects the second inductor to the voltage reference and to the negative voltage of the symmetrical power supply.

In one embodiment, at least one capacitive branch additionally comprises a resistor in parallel with the condenser, such that the corresponding branch of the excited inductor is arranged in a Maxwell bridge configuration. In another embodiment, at least one capacitive branch additionally comprises a resistor in series with the condenser, such that the corresponding branch of the excited inductor is arranged in a Hay bridge configuration.

Another object of the present invention is a coin discriminating device that comprises a coin sensor as described previously; a signal amplifying and conditioning module configured to receive and process the signal captured by the coin sensor, obtaining a treated signal; a microcontroller configured to characterise a coin based on the information contained in the treated signal and generate a pattern excitation signal to the coin sensor.

Another object of the present invention is a method for characterising and discriminating coins comprising the following steps:

Disposing, in an electronic circuit:
   A first branch comprising a first inductor in series with a first resistor.
   A second branch comprising a second inductor in series with a second resistor, wherein the first and second inductors are arranged facing each other on both sides of a passage channel of coins to be discriminated.
   At least one capacitive branch, wherein each capacitive branch comprises a condenser and a resistor in series.
Alternately feeding the first and second branch with a pattern signal (e.g.: a multi-tone signal or a broadband signal) with spectral energy in at least two frequencies, such that the branch of the excited inductor at any given time is disposed in a bridge configuration with at least one capacitive branch.
Alternately measuring the voltage between the exit nodes of the excited bridge.

The method may comprise alternately connecting the unexcited inductor to the at least one transimpedance amplifier to measure the mutual induction between the first and second inductor.

BRIEF DESCRIPTION OF THE FIGURES

The attached drawings show an embodiment of the coin sensor of the invention, provided by way of non-limiting example. In the drawings:

FIG. 6A shows an example of a multi-tone signal and switching signal generated by the coin sensor.

FIG. 6B shows a succession of multi-tone signals generated.

DETAILED DESCRIPTION OF AN EMBODIMENT

The constitution and operation of the coin sensor of the present invention shall be more readily understood with the following description, made in reference to the example of embodiment shown in the attached drawings.

Figure 1:
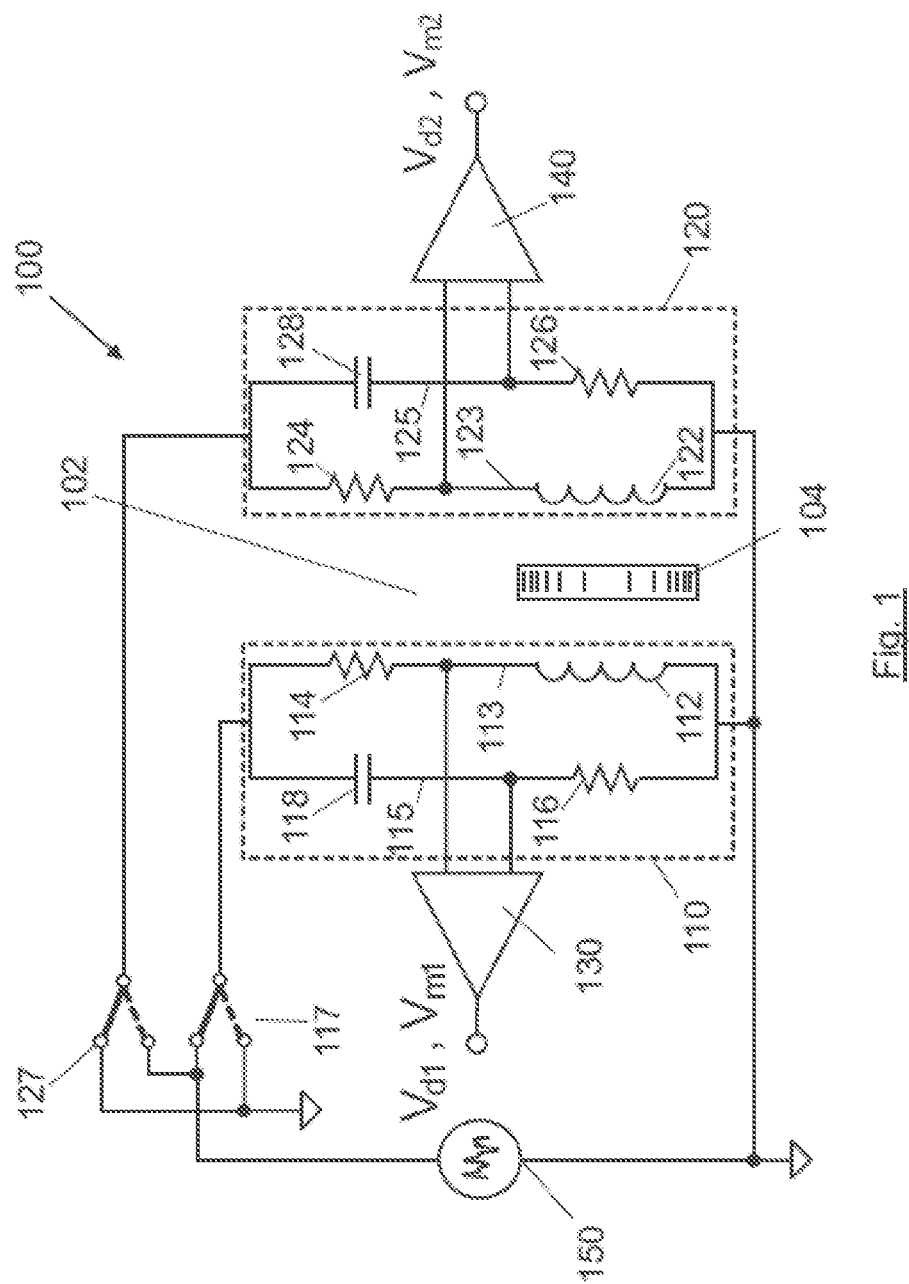
FIG. 1 shows a sensor with two inductors with independent bridges for measuring the inherent and mutual impedances of the inductors.

FIG. 1 shows a schematic view of a basic and novel embodiment of a coin sensor 100 that uses two inductors (first inductor 112 and second inductor 122) magnetically coupled and which are positioned on both sides of the passage channel 102 of the coin 104a to be discriminated, for measuring the inherent and mutual impedances of the inductors (112, 122). Both inductors (112, 122) are assembled, each separately, in a bridge-type configuration, forming a first bridge 110 and a second bridge 120. An inductive branch of each bridge (first inductive branch 113 and second inductive branch 123) comprises the corresponding inductor (112, 122) in series with a resistor (first resistor 114 and second resistor 124), while the other branch of each bridge (third branch 115 and fourth branch 125) includes a resistor (116, 126) in series with a condenser (118, 128). A differential amplifier (first differential amplifier 130 and second differential amplifier 140) is connected between the measuring points of each bridge (110, 120), at the exit of which a differential voltage signal appears ($V_{d1}$, $V_{d2}$) related to the first inductive branch 113 and the second inductive branch 123 and a mutual induction voltage signal ($V_{m1}$, $V_{m2}$) related to the first inductive branch 113 and the second inductive branch 123, representative of a pattern signal injected by a generator 150 and of the variations in the inherent and mutual impedances of the inductors (112, 122) triggered by the passage of the coins 104.

The multi-tone signal generator 150 alternately injects a signal simultaneously composed of at least two tones with a different frequency, preferably three tones, in each of the bridges (110, 120). The frequencies of each of the tones are sufficiently separated therebetween so as to allow a differentiation in the measurements in accordance with the depth of penetration of the electromagnetic field in the interior of the coins 104, which shall be representative of their structure and composition. This characteristic makes it possible to accurately characterise coins composed of layers of different metals.

The signal generator 150 alternately feeds one and another bridge (110, 120) through the pair of switches (117, 127), measuring the exits of both bridges in each case ($V_{d1}$, $V_{m1}$; $V_{d2}$, $V_{m2}$) which, once treated, make it possible to calculate the impedances inherent to both inductors (112, 122) and the mutual impedances ($M_{21}$, $M_{12}$). These measurements are made during the idle state and during the passage of the coin 104 being analysed and the activation time is dependent on the chosen frequencies, passage speed of the coins 104, processing capacity, etc. The topology of the sensor of FIG. 1, although functional, has the drawback of having low sensitivity and, therefore, a low signal/noise ratio in the measurements related to mutual impedance ($M_{12}$, $M_{21}$); i.e. the measurement of the receiver side of the signal emitted by the active bridge disposed on the opposite side of the coin passage.

Figure 2:
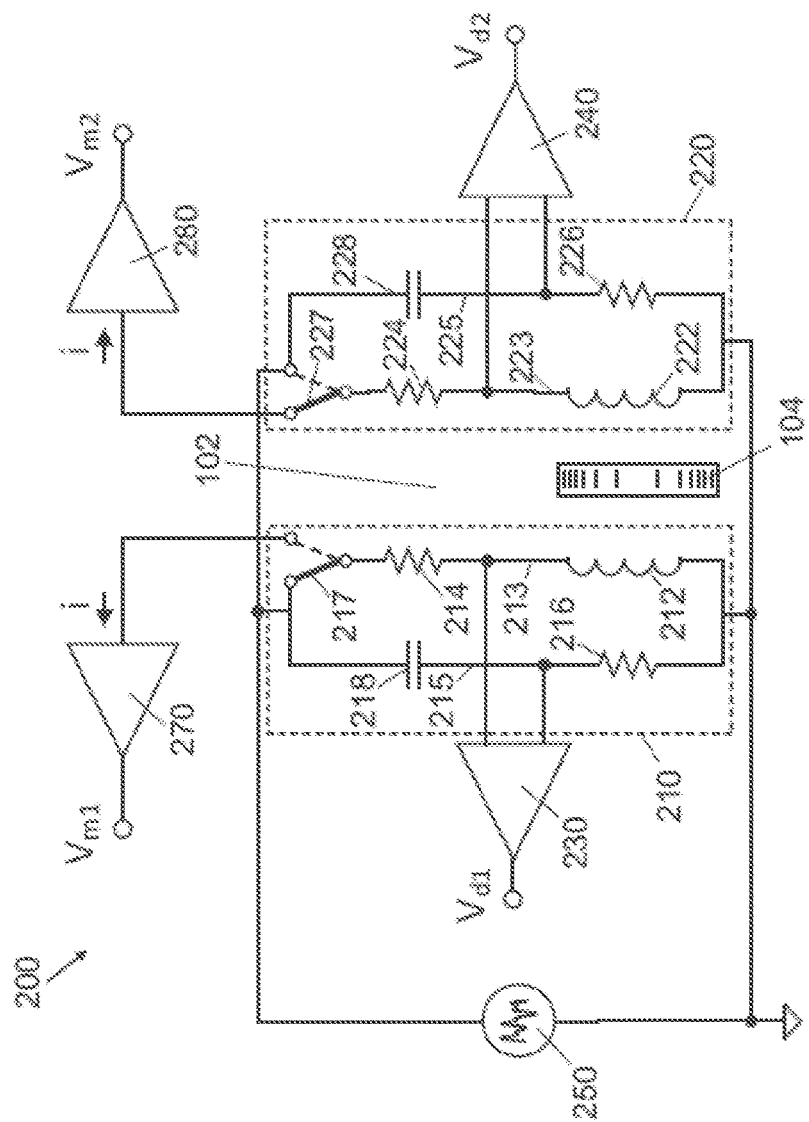
FIG. 2 shows a coin sensor according to the present invention, wherein amplifiers associated with each of the bridges and transconductance amplifiers are used in the sensor branches.

FIG. 2 shows an embodiment of a coin sensor 200 that solves the aforementioned problem. A first inductive branch 213, that forms part of a first bridge 210, comprises a first inductor 212 and a first resistor 214. A second inductive branch 223, that forms part of a second bridge 220, comprises a second inductor 222 and a second resistor 224. A first capacitive branch 215 and a second capacitive branch 225, that respectively form part of the first bridge 210 and second bridge 220, comprise a resistor (216, 226) and a condenser (218, 228). A switch (first switch 217 and second switch 227) is included in each of the bridges (210, 220) serially interspersed with the inductive branch (213, 223) that includes the inductor (212, 222), such that in a first position the switch (217, 227) connects said inductive branch (213, 223) to the first capacitive branch 215 or second capacitive branch 225, as appropriate, to form a bridge, as described in FIG. 1, while in a second position the bridge disappears and the inductive branch (213, 223) included in the inductor (212, 222) is connected to a transimpedance amplifier (either a first transimpedance amplifier 270 or a second transimpedance amplifier 280, as appropriate), this topology being optimal for measuring the signal related to mutual impedance ($M_{12}$, $M_{21}$). In this way, the device of the invention alternately uses the bridge configuration in one inductor and the connection of the opposed inductor to a transimpedance amplifier through the pair of switches (217, 227).

In the example represented in FIG. 2, the first switch 217 is activated in the first position, using the bridge configuration such that the inductor 212 of the first bridge 210 is fed by a multi-tone signal generator 250, while the second switch 227 is activated in the second position, such that the inductor of the second bridge 220 is connected to the second transimpedance amplifier 280. The switches (217, 227) alternate their positions over time, such that in a subsequent instance the first switch 217 is activated in the second position (such that the first inductor 212 is connected to the first transimpedance amplifier 270), whereupon the second switch 227 is activated in the first position, forming a bridge for the second inductor 222.

The alternation of the switching is performed at the frequency deemed convenient, depending on the frequencies of the multi-tone signal generator 250, particularly the lower frequency and passage speed of the coins 104. Similarly to that described in FIG. 1, the bridge exits $V_{d1}$, $V_{d2}$ related to the emitter inductor are measured by means of two differential amplifiers (230, 240) connected to the bridges, while the bridge exits $V_{m1}$, $V_{m2}$ related to the receiver inductors, as opposed to the circuit of FIG. 1, are measured by means of the transimpedance amplifiers (270, 280), which convert the current generated by said inductor to an output voltage with a better signal/noise ratio and smaller phase difference with respect to the circuit that includes the receiver inductor in the bridge.

Figure 3:
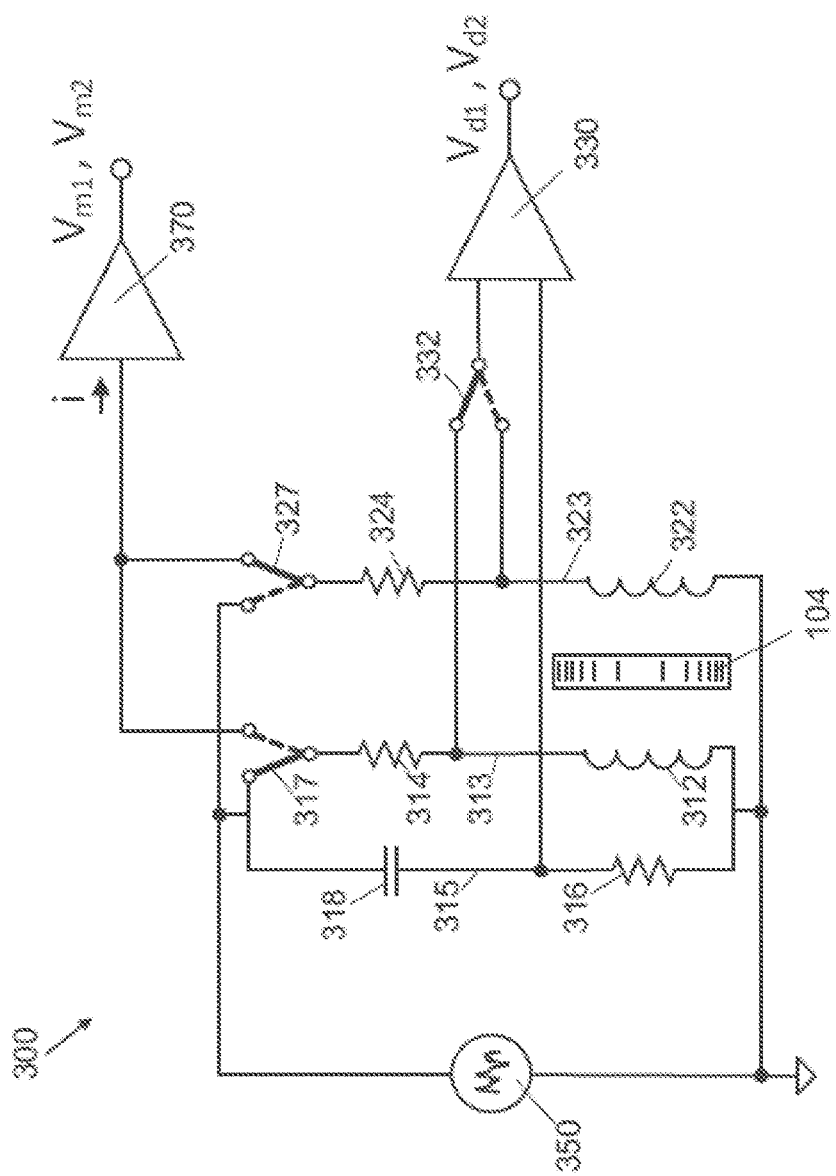
FIG. 3 shows a simplification of the coin sensor of FIG. 2.

FIG. 3 shows a simplification of the circuit of FIG. 2. A first inductive branch 313 comprises a first inductor 312 and a first resistor 314. A second inductor branch 323 comprises a second inductor 322 and a second resistor 324. A common branch 315 comprises a resistor 316 and a condenser 318. In the coin sensor 300 of the embodiment of FIG. 3 the R-C branch of the bridge (common branch 315) is shared by both inductors (312, 322) which, in addition to eliminating components, simplifies the sensor calibration phase, in which the values of each of the components that form part of the sensor circuit are accurately determined. A common differential amplifier 330 is also shared, to which end a switch with two positions 332 is included, synchronised with the first switch 317 and second switch 327, which connects said common differential amplifier 330 to the exit of the corresponding bridge, which in the first position is the first inductive branch 313 that includes the first inductor 312, and in the second position is the second inductive branch 323 that includes the second inductor 322. In this embodiment, a common transimpedance amplifier 370 is also shared, based on the position of the first switch 317 and second switch 327.

Figure 4:
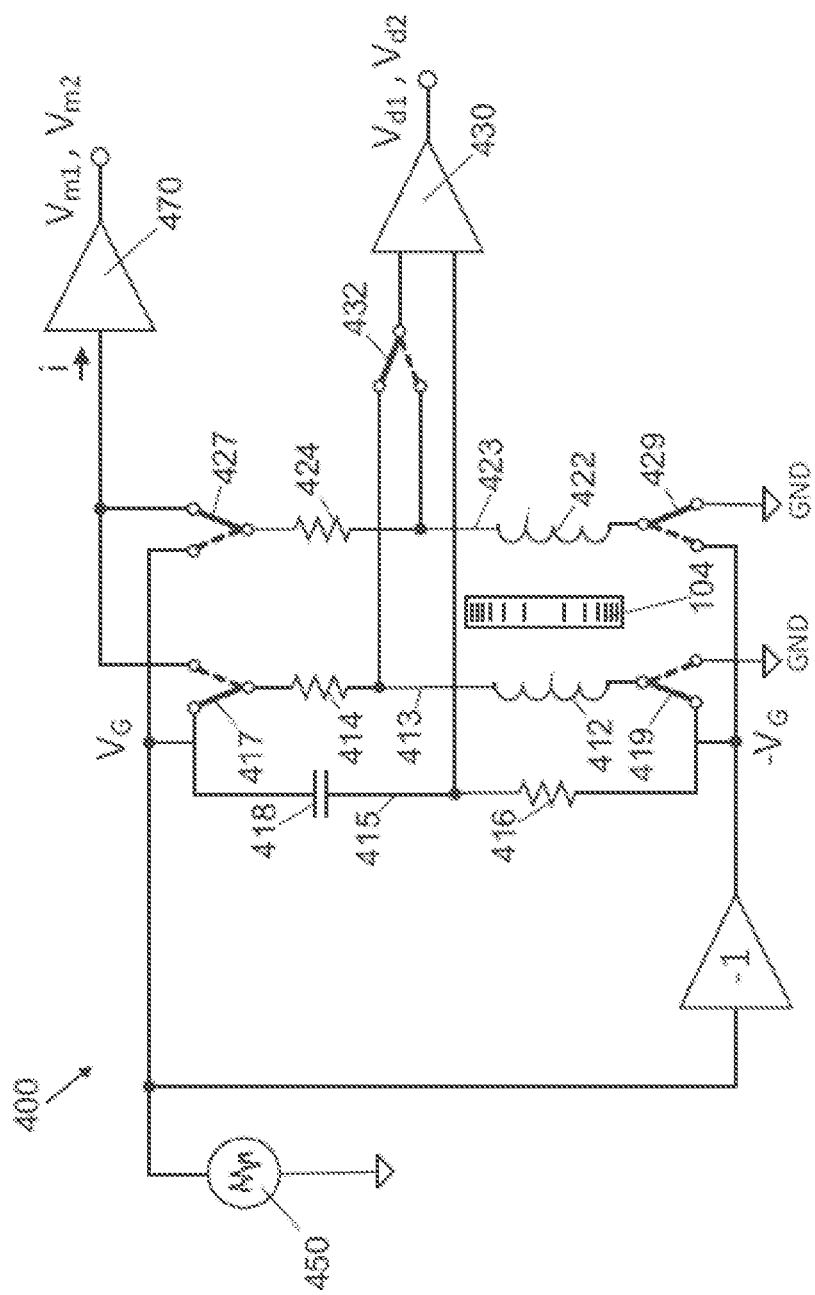
FIG. 4 shows an improved version of the coin sensor of FIG. 3, with a symmetrical excitation signal.

FIG. 4 shows a coin sensor 400 that improves the embodiment of FIG. 3, wherein the bridge is symmetrically fed ($V_G$, $-V_G$) by a multi-tone generator 450, which implies multiplying the excitation signal for a single dynamic range by a factor of two and, therefore, the signal/noise ratio at the exit of both amplifiers and in the measurements related to the inherent and mutual impedance. The embodiment of FIG. 4 shows the different components of the electronic circuit of the coin sensor 400:

A first inductive branch 413 with a first inductor 412 and a first resistor 414.

A second inductive branch 423 with a second inductor 422 and a second resistor 424.

A common branch 415 with a resistor 416 and a condenser 418.

A first switch 417 and second switch 427 in the first inductive branch 413 and second inductive branch 423, respectively, that connect the respective branch in one position to the generator 450 and in the opposite position to the transimpedance amplifier 470.

A common differential amplifier 430 with an input connected alternately, by means of a switch 432, to the intermediate node of the first inductive branch 413 and second inductive branch 423.

A common transimpedance amplifier 470 connected alternately, by means of the first switch 417 and second switch 427, to the first inductive branch 413 or second inductive branch 423 (at any given time it connects to the branch whose inductor is not excited).

A third 419 and fourth 429 switch that respectively connect the inductor of the first inductive branch 413 and second inductive branch 423 to the reverse voltage ($-V_G$) of the symmetrical power supply or to the voltage reference (GND), in an alternate manner.

Each of the aforementioned switches with two positions may be replaced by two switches with a common terminal, such that when one of them is "ON" the other is "OFF" and vice versa. Likewise, each pair of switches may be replaced with a double switch.

Figure 5A:
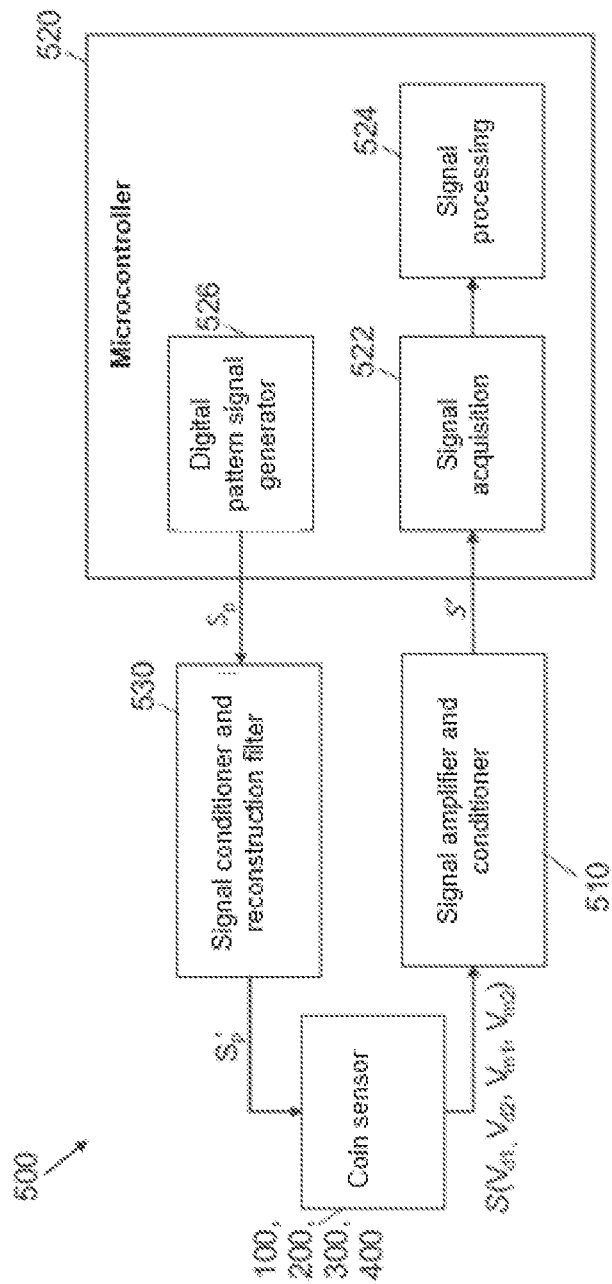
FIG. 5A shows a block diagram of a coin recognition device that uses the proposed sensor.

FIG. 5A shows a schematic view of a block diagram with the elements of a coin discriminating device 500 that uses the proposed coin sensor (100; 200; 300; 400) in any of the embodiments of the preceding figures. The coin sensor (100; 200; 300; 400) alternately excites the inductors as the coin 104 to be discriminated crosses the sensor located around the passage channel 102 of the coin. During the passage of the coin the coin sensor (100; 200; 300; 400) provides a signal S containing useful information on the coin (differential voltages $V_{d1}$ and $V_{d2}$ and mutual induction voltages $V_{m1}$ and $V_{m2}$ of the inductors). The signals S ($V_{d1}$, $V_{d2}$, $V_{m1}$, $V_{m2}$) provided by the coin sensor (100; 200; 300; 400) are amplified and treated by a signal amplifying and conditioning module 510. The treated signals S' are transmitted to a data processing unit, preferably a microcontroller 520. The microcontroller 520 is in charge of analysing the treated signal S' and characterising the coin to discriminate it and decide whether or not it is valid. To this end, it performs the acquisition of the treated signals 522 and subsequent signal processing 524, including demodulations, interpolations, calculation of impedances, channel and lift-off compensations, until reaching the coin identification and authentication criteria. A digital pattern signal generator 526 of the microcontroller 520 is in charge of digitally generating a pattern signal $S_p$ with spectral energy at the frequencies of interest, which is adequately conditioned and filtered in a signal conditioning module 530 to obtain the excitation signal Sp' to the coin sensor (100; 200; 300; 400).

Figure 5B:
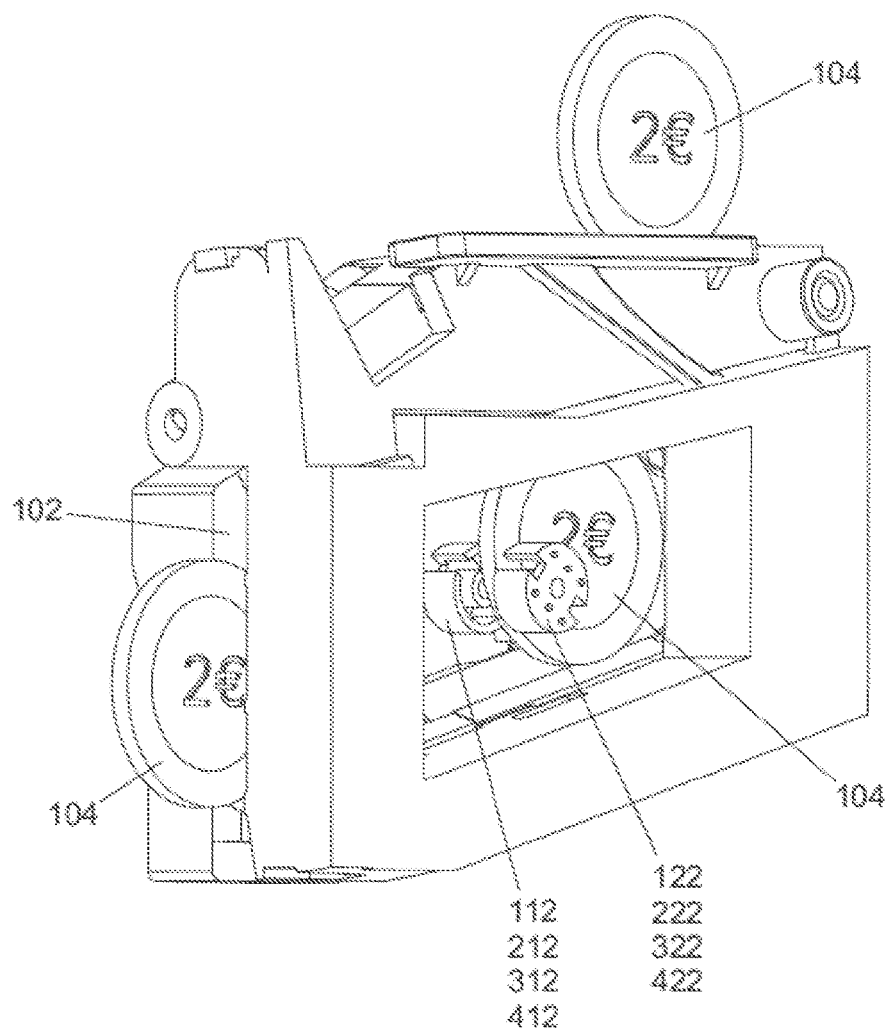
FIG. 5B shows a perspective view of a coin discriminating device wherein the coin sensor inductors and their position in the coin passage channel are represented.

FIG. 5B shows a perspective view of an example of a coin discriminating device wherein the inductors (112, 122; 212, 222; 312, 322; 412, 422) of the coin sensor (100; 200; 300; 400) are represented located on both sides of the rolling track along which the coins 104 to be discriminated circulate. The figure does not show the microcontroller or the electronic circuits. The coin 104 to be discriminated is represented circulating along the passage channel 102 in three different positions: entering the coin sensor, leaning on the rolling track upon entering the coin sensor and exiting the coin sensor.

FIG. 6A shows, by way of example, a multi-tone signal 610 produced by the generator and the switching signal 620 applied to the switches of a coin sensor in accordance with the present invention. FIG. 6B shows a succession of multi-tone signals 610 and the associated switching signal 620. The multi-tone signal 610 is emitted during a time interval T, the signal is no longer emitted, the switching signal 620 is switched and the same multi-tone signal 610 is emitted during another time interval, and so on.

The time interval T during which the multi-tone signal 610 is emitted must consider a transition time $T_t$ for the signal to be stabilised, an acquisition window $T_a$, sufficient to adequately demodulate the frequencies used, plus a short guard time $T_g$. The time interval of the acquisition window $T_a$ used must be sufficiently large for the demodulation (obtainment of the amplitude and phase of each harmonic) to have good accuracy and sufficiently small for the time interval of the full cycle between one demodulation and the next to correspond to a small advance of the coin. The time interval of the acquisition window $T_a$ depends to a large extent on the sampling frequency and on the mathematical demodulation method used. Thus, for example, if a FFT is used as a demodulation method, it is convenient for the acquisition window $T_a$ to contain a whole number of periods of all the frequencies; while if using the method of approximation to a sinusoidal function by minimum difference of squares, it is not necessary for the number of cycles in the window to be a whole number of the periods of the different frequencies.

The entire cycle, from the start of the emission by an inductor until the emission by that same inductor starts again, determines a measurement or sample over time (sample time $T_m$). Thus, for example, for the circuit of FIG. 2, a full cycle $T_m$ (shown in FIG. 6B) corresponds to the time during which the switching signal 620 has positive voltage $V_{con+}$ (first switch 217 and second switch 227 in the position shown in FIG. 2) plus the time in which the switching signal 620 has a negative voltage $V_{con-}$ (first switch 217 and second switch 227 in the alternate position to that shown in FIG. 2). Different embodiments of the present invention will invest a different time between samples, based on whether one or two pairs of coils are used, the relationship between measurement accuracy and the desired temporal resolution, the coin passage speed, among other design characteristics. The fixed time $T_m$ for each embodiment typically falls within the range of 0.25 ms and 5 ms.

Figure 7A:
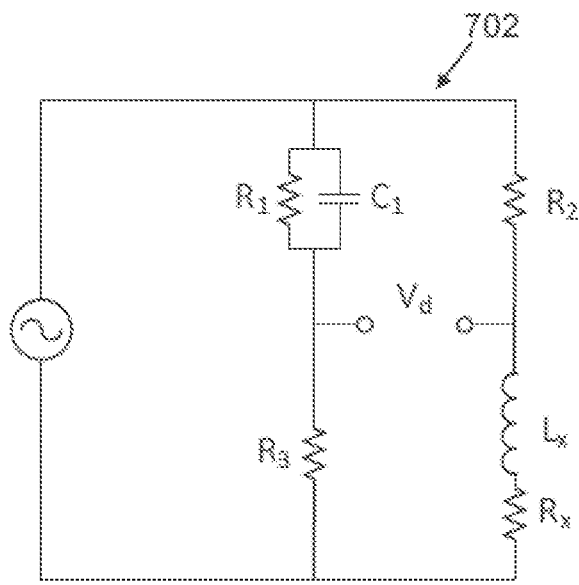
FIGS. 7A and 7B show, respectively, a Maxwell bridge and a Hay bridge.
Figure 7B:
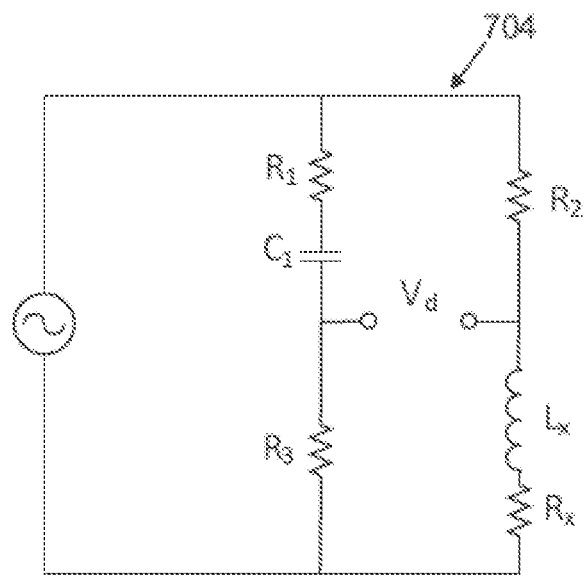

The embodiments of the coin sensor shown in FIGS. 1 to 4 describe the arrangement of the branch of the excited inductor at any given time in parallel with a capacitive branch RC, forming a bridge. The capacitive branch may be that shown in said figures, a condenser in series with a resistor. In another embodiment, the capacitive branch may include a resistor R1 in parallel with the condenser C1, to form a Maxwell bridge 702, such as that represented in FIG. 7A. In an alternate embodiment, the capacitive branch includes a resistor R1 in series with the condenser C1 to form a Hay bridge 704, such as that shown in the example of FIG. 7B. The examples shown in FIGS. 7A and 7B show, respectively and for illustrative purposes, isolated Maxwell and Hay bridges, without showing the other components associated with the coin sensor (switches, differential amplifiers, transimpedance amplifiers, etc.).

The invention claimed is:

1. A coin sensor comprising an electronic circuit with:
    a first inductive branch comprising a first inductor in series with a first resistor;
    a second inductive branch comprising a second inductor in series with a second resistor, wherein the first inductor and second inductor are arranged facing each other on both sides of a coin passage channel of coins to be discriminated;
    at least one capacitive branch, wherein each capacitive branch comprises a condenser and a resistor in series;
    an excitation circuit comprising a generator and at least one pair of switches, wherein the excitation circuit is configured to alternately feed the first inductive branch and the second inductive branch with a pattern signal with spectral energy in at least two frequencies, such that the first inductive branch of the first inductor or second inductive branch of the second inductor excited at any given time is disposed in a bridge configuration with the at least one capacitive branch; and
    at least one differential amplifier configured to alternately measure a voltage between exit nodes of the bridge configuration in an excited state.

2. The coin sensor, according to claim 1, wherein the electronic circuit comprises at least one transimpedance amplifier; and wherein the excitation circuit is configured to alternately connect the inductive branch of the unexcited inductor to the at least one transimpedance amplifier.

3. The coin sensor, according to claim 2, wherein the excitation circuit comprises:

a first switch in the first inductive branch in series with the first inductor and the first resistor;

a second switch in the second inductive branch in series with the second inductor and the second resistor.

4. The coin sensor, according to claim 3, wherein the electronic circuit comprises a first capacitive branch and a second capacitive branch, each of the first and second capacitance branches comprising a condenser and a resistor in series, said capacitive branches being connected respectively to the first inductive branch and the second inductive branch, alternately forming a bridge when the excitation circuit feeds the corresponding inductive branch;

wherein the at least one differential amplifier comprises a first differential amplifier connected to intermediate nodes of the first inductive branch and the first capacitive branch, and a second differential amplifier connected to the intermediate nodes of the second inductive branch and the second capacitive branch;

and wherein the at least one transimpedance amplifier comprises a first transimpedance amplifier and a second transimpedance amplifier respectively connected to the first inductive branch and second inductive branch when the corresponding inductive branch is not excited.

5. The coin sensor, according to claim 4, wherein the first switch is configured to connect the first inductive branch alternately to the first capacitive branch and to the first transimpedance amplifier; and wherein the second switch is configured to connect the second inductive branch alternately to the second transimpedance amplifier and to the second capacitive branch.

6. The coin sensor, according to claim 3, wherein the electronic circuit comprises a common capacitive branch with a condenser and a resistor in series, wherein said common capacitive branch is alternately connected to the first inductive branch and to the second inductive branch, alternately forming a bridge when the excitation circuit feeds the corresponding inductive branch;

wherein the at least one differential amplifier comprises a common differential amplifier with a first input connected to the intermediate node of the common branch and a second input alternately connected to the intermediate node of the first inductive branch and to the intermediate node of the second inductive branch;

and wherein the at least one transimpedance amplifier comprises a common transimpedance amplifier alternately connected to the first inductive branch and to the second inductive branch when the corresponding branch is not excited.

7. The coin sensor, according to claim 6, wherein the excitation circuit is configured to feed the common branch and the first inductive branch and the second inductive branch alternately with a symmetrical power supply.

8. The coin sensor, according to claim 7, wherein the excitation circuit comprises:

a third switch in the first inductive branch that alternately connects the first inductor to the reverse voltage of the symmetrical power supply and to the voltage reference;

a fourth switch in the second inductive branch, that alternately connects the second inductor to the voltage reference and to the inverted voltage of the symmetrical power supply.

9. The coin sensor, according to claim 1, wherein at the least one capacitive branch additionally comprises a resistor in parallel with the condenser, such that the inductive branch corresponding to the excited inductor is arranged in a Maxwell bridge configuration.

10. The coin sensor, according to claim 1, wherein at the least one capacitive branch further comprises a resistor in series with the condenser, such that the inductive branch corresponding to the excited inductor is disposed in a Hay bridge configuration.

11. A coin discriminating device comprising:

a coin sensor, according to claim 1;

a signal amplifying and conditioning module configured to receive and process the signal provided by the coin sensor, obtaining a treated signal;

a microcontroller configured to characterize a coin based on the information contained in the treated signal and generate an excitation pattern signal $S_p$ to the coin sensor.

12. A method for characterizing and discriminating coins, comprising:

arranging, in an electronic circuit:

a first inductive branch comprising a first inductor in series with a first resistor;

a second inductive branch comprising a second inductor in series with a second resistor, wherein the first inductor and second inductor are arranged facing each other on both sides of a passage channel of coins to be discriminated;

at least one capacitive branch, wherein each capacitive branch comprises a condenser and a resistor in series;

alternately feeding, by an excitation circuit, the first inductive branch and the second inductive branch with a pattern signal with spectral energy in at least two frequencies, such that the first inductive branch of the first inductor or second inductive branch of the second inductor is excited at any given time and disposed in a bridge configuration with the at least one capacitive branch;

alternately measuring, by at least one differential amplifier, a voltage between the exit nodes of the bridge configuration in an excited state.

13. The method, according to claim 12, which comprises alternately connecting the unexcited inductor to at least one transimpedance amplifier for measuring the mutual induction between the first inductor and second inductor.

14. The method, according to claim 12, wherein the pattern signal is a broadband signal.

* * * * *